Sept. 26, 1961 A. MUELLER 3,001,770
ICE CREAM FLAVOR MIXING MACHINE
Filed April 16, 1959 4 Sheets-Sheet 1

INVENTOR.
Alfred Mueller
BY
William J. Ruano
ATTORNEY.

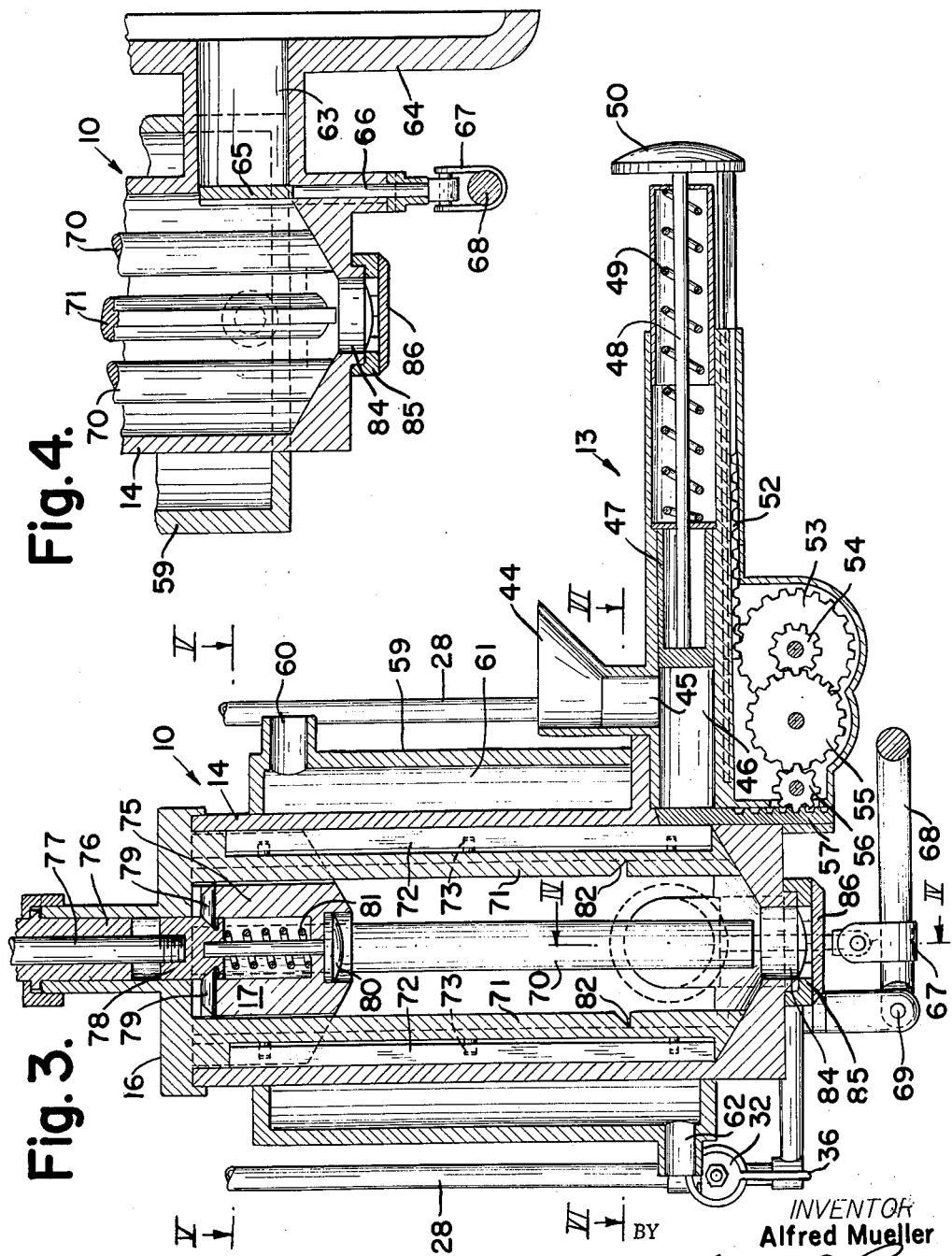

Sept. 26, 1961 A. MUELLER 3,001,770
ICE CREAM FLAVOR MIXING MACHINE
Filed April 16, 1959 4 Sheets-Sheet 3

INVENTOR:
Alfred Mueller
BY
William J. Ruano
ATTORNEY.

Sept. 26, 1961 A. MUELLER 3,001,770
ICE CREAM FLAVOR MIXING MACHINE
Filed April 16, 1959 4 Sheets-Sheet 4
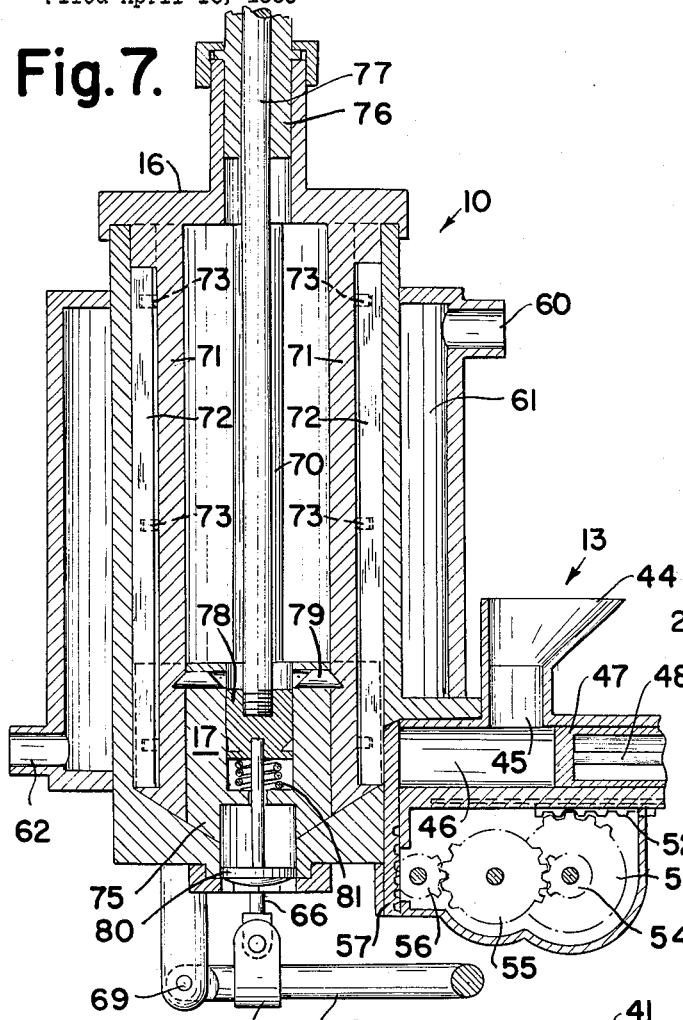
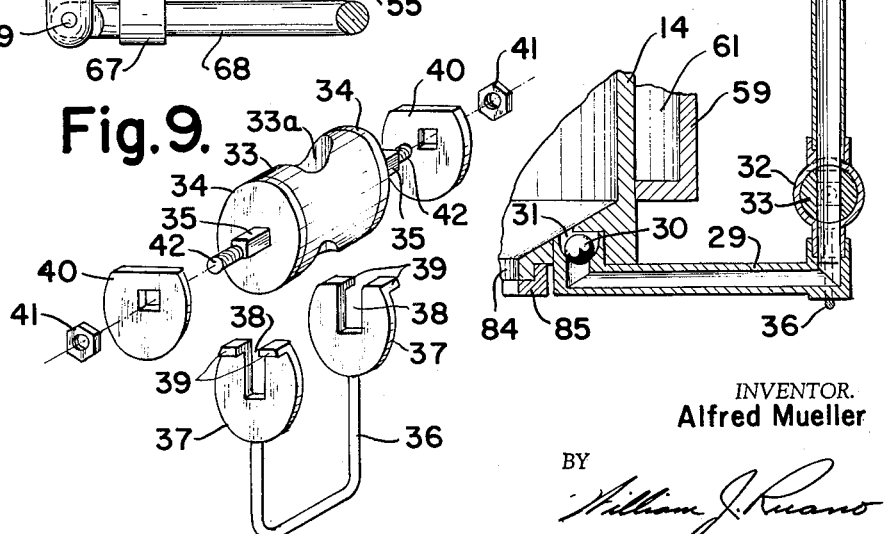
INVENTOR.
Alfred Mueller
BY
*William J. Ruano*
ATTORNEY.

United States Patent Office 3,001,770
Patented Sept. 26, 1961

3,001,770
ICE CREAM FLAVOR MIXING MACHINE
Alfred Mueller, 524 Center St., Reading, Pa.
Filed Apr. 16, 1959, Ser. No. 806,948
2 Claims. (Cl. 259—7)

This invention relates to an ice cream flavor mixing machine and, more particularly, to a unitary machine for selectively mixing any one of a variety of ice cream flavors with ice cream, together with crushed nuts, as desired.

An outstanding disadvantage of ice cream flavor mixing machines as commonly used is that only one flavor may be mixed with the ice cream at one time in a single machine. Thus, for example, a strawberry flavor may be mixed one day and a vanilla flavor may be mixed the next, however, thorough cleaning of the strawberry flavor is necessary. This is disadvantageous because the various amounts of particular flavors cannot be always anticipated. Furthermore, particularly in ice cream drive-in stands, it is very desirable to mix different flavors within short time periods in order to satisfy the every-changing demands of customers for various flavors.

An object of my invention is to provide an ice cream flavor mixing machine which is devoid of the above named disadvantages of conventional machines and which will enable the selective mixing of a number of different flavors with ice cream by simple control mechanisms and which will enable also the mixing of nuts with the various flavors, as desired.

A further object of my invention is to provide an ice cream flavor mixing machine of unitary construction which involves a minimum number of parts of relatively simple construction and which will enable mixing of ice cream with perhaps eight or more different flavors in the same mixing chamber by simply manipulating certain control levers, also which enables introduction of measured amounts of crushed nuts, when desired, into the mixture, and which may be easily and quickly cleaned so as to avoid mixing of different flavors.

Other objects and advantages of my invention will become more apparent from a study of the following description taken with the accompanying drawings wherein:

FIG. 3 is a vertical, cross-sectional view taken along line III—III of FIG. 1;

FIG. 4 is a fragmentary, cross-sectional view taken along line IV—IV of FIG. 3;

FIG. 7 is a vertical cross-sectional view similar to FIG. 3 except that it shows the parts in a different position, that is, it shows the position of the piston and associated parts when the ice cream has been completely extruded or discharged from the mixing chamber.

Figure 1:
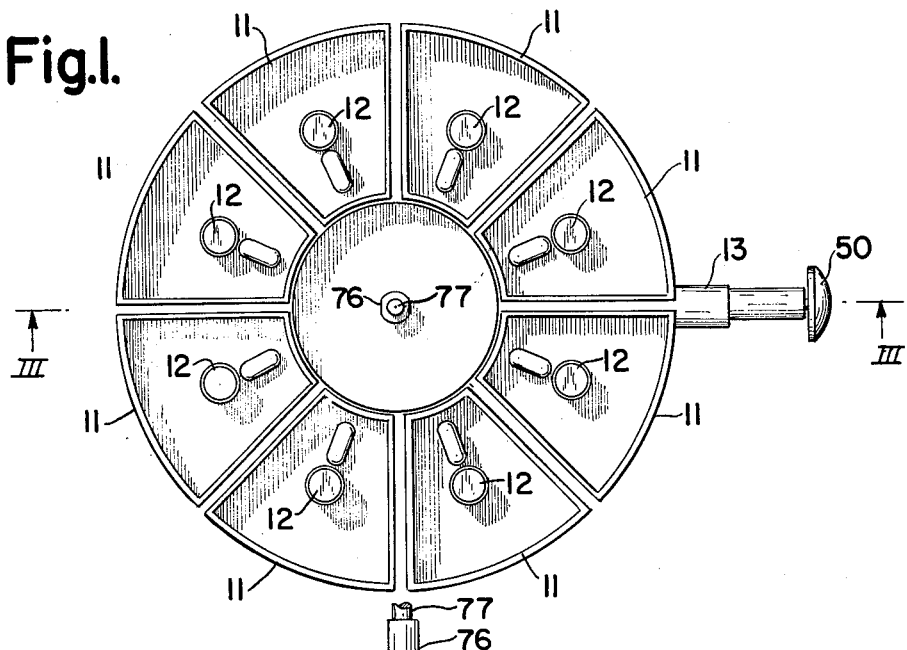
FIG. 1 is a top or plan view of a flavor mixing machine embodying the principles of the present invention.
Figure 2:
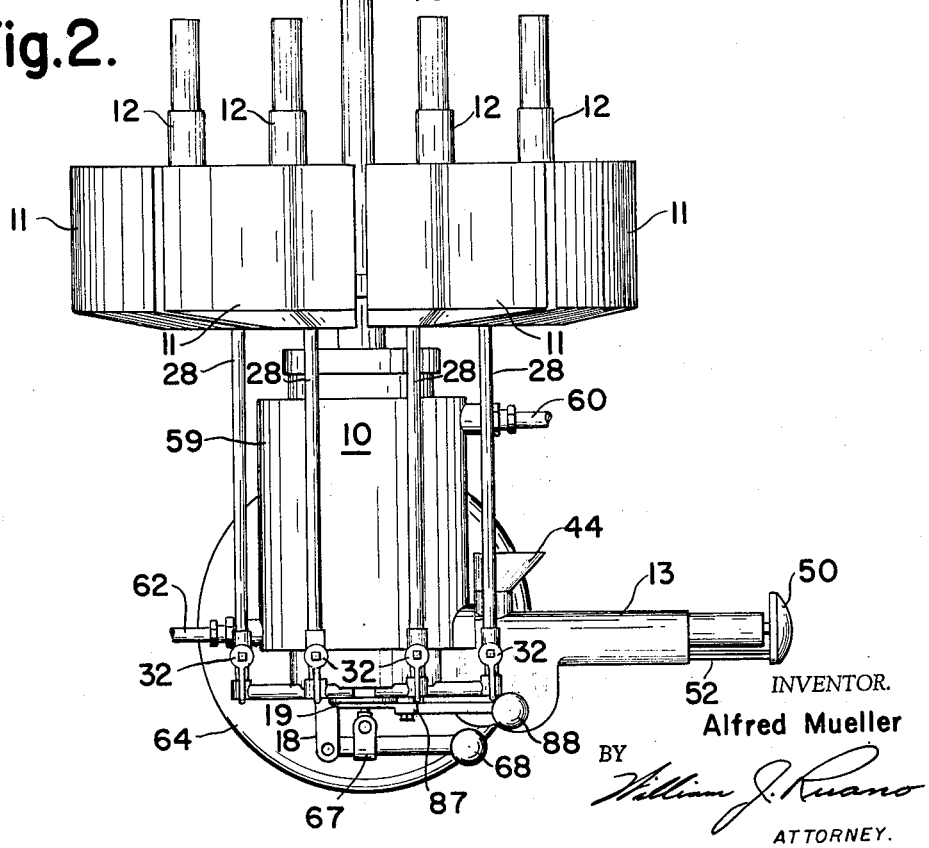
FIG. 2 is a side elevational view of the machine shown in FIG. 1.

FIG. 8 is a vertical, cross-sectional view of one of the flavor injecting means 12 shown in FIGS. 1 and 2; and FIG. 9 is an enlarged, perspective, exploded view of one of the shut-off valves 32 shown in FIG. 2.

Referring more particularly to FIGS. 1 and 2, broadly stated, the ice cream flavor mixing machine, generally referred to by numeral 10, comprises a plurality of flavor containers 11, shaped in the form of segments of a cylinder, there being eight such containers shown, although it should be understood that a larger or smaller number may be used instead, as desired. Any of the flavors may be selectively introduced into the central mixing chamber 10 after flowing through pipe 28 and control valve 32, as will be described in more detail hereinafter. The selected flavor is then mixed with ice cream which is introduced into the mixing chamber 14. A nut injector 13 operated by plunger 50 introduces measured amounts of crushed nuts, when desired, into the ice cream and flavor being mixed. Ice cream received from an ice cream freezer (not shown) is introduced through gate valve 18 and into the mixing chamber 14 and is there mixed with the selected flavor and nuts by means of an agitator 16 as will be described more fully hereinafter. On the completion of the agitation of the selected mixture of ice cream, flavor and nuts, the piston or plunger 17 is moved from the position shown in FIG. 3 to that shown in FIG. 7 so as to force the mixture downwardly through a discharge opening, which may be opened or closed by gate valve 86 (see FIG. 3).

One of the flavor injecting means 12 illustrated in FIGS. 1 and 2 is shown in more detail in FIG. 8 and comprises a plunger 21 which houses a spring 22 and slidably fits in a stationary housing portion. As plunger 21 is depressed it compresses the spring 22 and moves the piston rod 23 and piston 24 downwardly. Air in chamber 24a is thus expelled outwardly through pipes 28 and 29 upon unseating of one way or check valves 27 and 30. Upon release of plunger 21, the spring 22 will automatically lift piston 24 creating a suction in chamber 24a which draws in the flavor through an opening 25a as a consequence of unseating check valve 25, at the same time closing check valve 27. Upon the next depression of plunger 21, the flavor contained in chamber 24a will be forced through port 26 and the unseated check valve 27, through pipe 28, valve 33, pipe 29 through the unseated check valve 30 and into the mixing chamber 14.

As spring 22 automatically raises plunger 21 when plunger 21 is released, the above described operation will be repeated to permit another surge of flavor into chamber 24a which will be introduced into the mixing chamber 14 upon subsequent depression of the plunger 21.

One of the shut-off valves 32, shown in FIG. 2, is illustrated in more detail in FIG. 9, and is provided at the lower end of supply pipe 28 for the purpose of enabling cleaning of the mixing chamber 14. Valve 32 comprises valve part 33 having a valve opening or passage 33a and a pair of washers 34 fitting against each side of part 33 and each having a square hole fitting onto squared shaft portion 35. Handle 36 of substantially U-shape has washer-like extensions 37 that are slotted at 38 for fitting onto the correspondingly shaped square shaft 35. Extensions 37 have outwardly turned ears 39 which lie on top of the flat portions of washers 40 for supporting the handle 36 in place and preventing dropping out.

Nuts 41 fitted onto threaded portion 42 of the shaft hold the shut-off valve together. The U-shape or bight portion of handle 36 is adapted to straddle the lower end of pipe 29, as shown more clearly in FIG. 8, to keep the valve in normally open position.

The nut injector 13 is shown more clearly in FIG. 3 and comprises a receiving funnel 44 for introducing crushed nuts which flow downwardly through passage 45 into chamber 46 from where the nuts are pushed into the mixing cylinder 14 by means of a piston 47 connected to piston rod 48, pushed by plunger 50 against the action of the spring 49. Plunger 50 is rigidly connected to a rack 52 which meshes with the gear 53, coupled to a pinion 54 which, in turn, meshes with a gear 55 driving pinion 56 which slides rack or gate 57 vertically for the purpose of opening the slide type valve. As the gate valve or rack 57 is moved downwardly, a measured amount of nuts is injected into the mixing chamber or cylinder 14 by the piston 47. Upon release of plunger 50, spring 49 will automatically lift and close the gate valve 57. The nut injector will then be in readiness for the next operation.

FIG. 3 shows the construction of the mixing cylinder 14 and associated parts. A hollow jacket 59 surrounds the mixing cylinder 14 and encloses the refrigerant or freezing gases within the space 61 introduced into inlet opening 62 and discharged through outlet 60.

Figure 5:
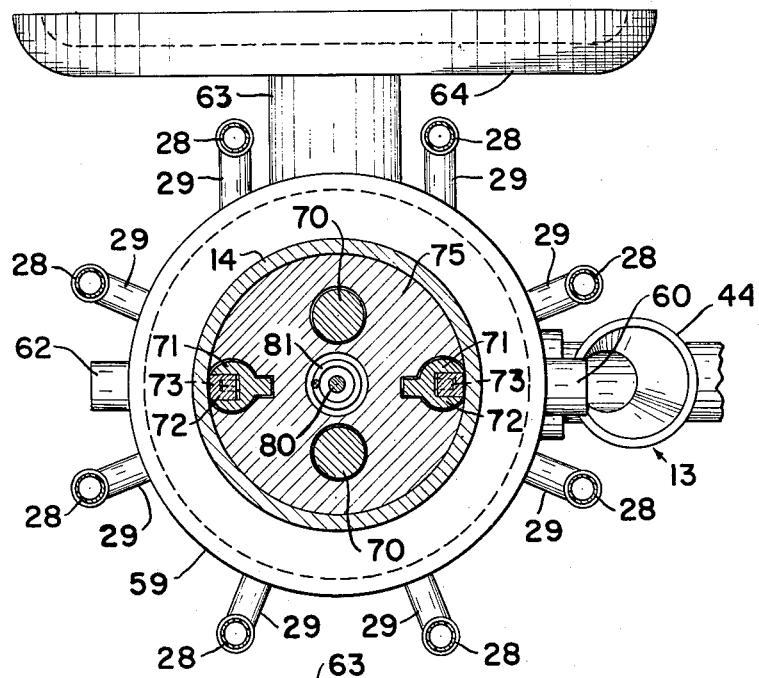
FIG. 5 is a cross-sectional view taken along line V—V of FIG. 3.
Figure 6:
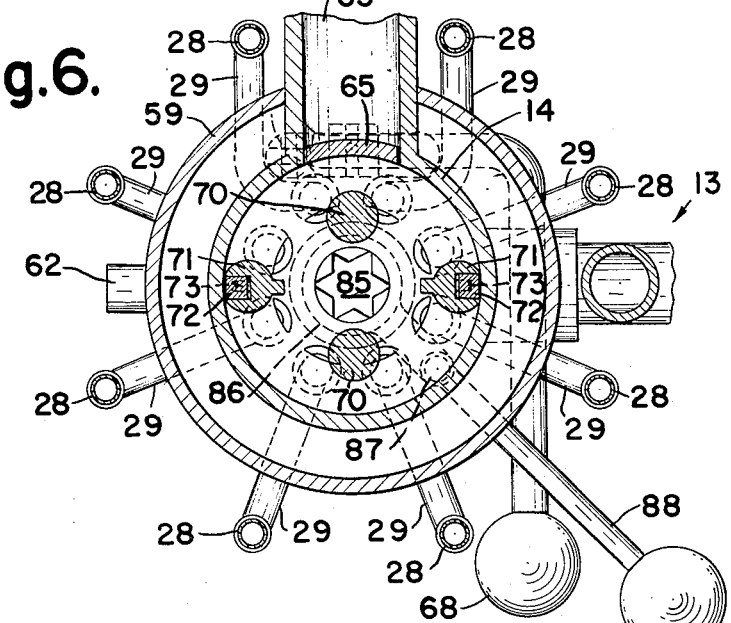
FIG. 6 is a cross-sectional view taken along line VI—VI of FIG. 3.

As shown more clearly in FIGS. 5 and 6, the cylinder 14 has an inlet passage 63 connected to the ice cream freezer (not shown) by means of flange 64 for admitting ice cream in the mixing cylinder 14 by operation of a valve operating mechanism. Such valve operating mechanism consists of gate valve 65, shown more clearly in FIG. 4, which is connected to a rod 66 which, in turn, is connected to a link 67 and handle 68. By lowering handle 68 about pin 59 as a pivot, ice cream is admitted into the mixing cylinder through passage 63 by virtue of opening of the gate valve 65. After a sufficient amount of ice cream is introduced, valve 65 may be closed.

The ice cream is mixed by means of an agitator 16 which extends throughout the length of mixing cylinder 14 and includes posts 70 and elements 71. Fitting in keyhole slots in elements 71 are loosely supported wiper blades 72 which are held in place by means of pins 73 as shown more clearly in FIG. 5. The purpose of blades 72 is to keep the inside surface of the cylinder from icing.

The agitator 16 is rotated by drive shaft 76. Slidably mounted on posts 70 is a plunger means 17 which consists of a piston 75 that is connected to rod 77 independently housed in the drive shaft 76. The lower end of shaft 77 is threadedly connected to element 78 that is notched and into which notches are engaged pins 79. Contained within the plunger means 17 is a second plunger 80 which is normally biased upwardly by means of a helical spring 81.

After ice cream and a particular flavor, as well as nuts, are mixed by the agitator 16, plunger 75 is pushed downwardly by rod 77 from the position shown in FIG. 3 to that shown in FIG. 7, as the result of which the ice cream mix is extruded. As the horizontally slidable pins 79 become engaged with slots 82 of parts 71, the plunger 80 will continue its downward movement to fully extrude the ice cream from the outlet opening 84. As shown more clearly in FIGS. 6, 7 and 8, on the outlet 84 is mounted a decorating tip 85 for imparting a decorative effect to the extruded or discharged ice cream.

The control valve consists of a gate 86 that is pivoted away from the outlet 84 for the extrusion of ice cream by pivoting pin 87 and handle 88 as shown more clearly in FIG. 6.

Thus it will be seen that I have provided a unitary flavor mixing machine in which may be selectively introduced one of a plurality of different flavors as well as a supply of ice cream and one of nuts, if desired; furthermore I have produced a machine in which it is a simple matter to switch from mixing one flavor to another by merely controlling certain operating valves, whereby ice cream of any desired flavor may be mixed quickly in a matter of minutes without the possibility of mixture of undesired flavors; furthermore I have provided an ice cream machine which eliminates the necessity of having more than one machine for mixing more than one flavor.

While I have illustrated a single embodiment of my invention, it will be understood that this is by way of illustration only, and that various changes and modifications may be made within the contemplation of my invention and within the scope of the following claims.

I claim:

1. An ice cream flavor mixing machine comprising a substantially cylindrical mixing chamber, a plurality of flavor chambers associated therewith and connected thereto and containing different flavors, valve means for introducing a supply of ice cream into said chamber, conduit means and pump means controlled by additional valve means for selectively introducing one of said flavors into the mixing chamber, a plurality of vertical posts extending through the mixing chamber parallel to the axis thereof, a piston vertically slidable in said mixing chamber and guided by said posts and closely fitting the inner walls of the mixing chamber for extruding the ice cream mix and discharging it downwardly and outwardly from said chamber, agitating means rotatably mounted axially within and slidably fitted in said chamber and including scraper means for scraping ice tending to form on the inner walls of said mixing chamber, and discharge outlet means at the bottom of said chamber through which the ice cream is extruded and discharged by said piston.

2. A machine as recited in claim 1 together with means including a plunger for selectively introducing measured amounts of crushed nuts into the mixing chamber by a single stroke of the plunger for mixture with the ice cream and selected flavor.

References Cited in the file of this patent

UNITED STATES PATENTS

| | | |
|---|---|---|
| 1,458,282 | Fairbanks | June 12, 1923 |
| 2,032,961 | Vogt | Mar. 3, 1936 |
| 2,258,645 | Farrall et al. | Oct. 14, 1941 |
| 2,282,662 | Lindsey | May 12, 1942 |
| 2,491,852 | Carvel | Dec. 20, 1949 |
| 2,745,261 | Merrill | May 15, 1956 |
| 2,787,402 | Stiner et al. | Apr. 2, 1957 |

FOREIGN PATENTS

| | | |
|---|---|---|
| 64,649 | Netherlands | Oct. 15, 1949 |